Feb. 28, 1961 S. T. SEMEGEN 2,973,284
LEATHER-LIKE MATERIAL
Filed April 30, 1957
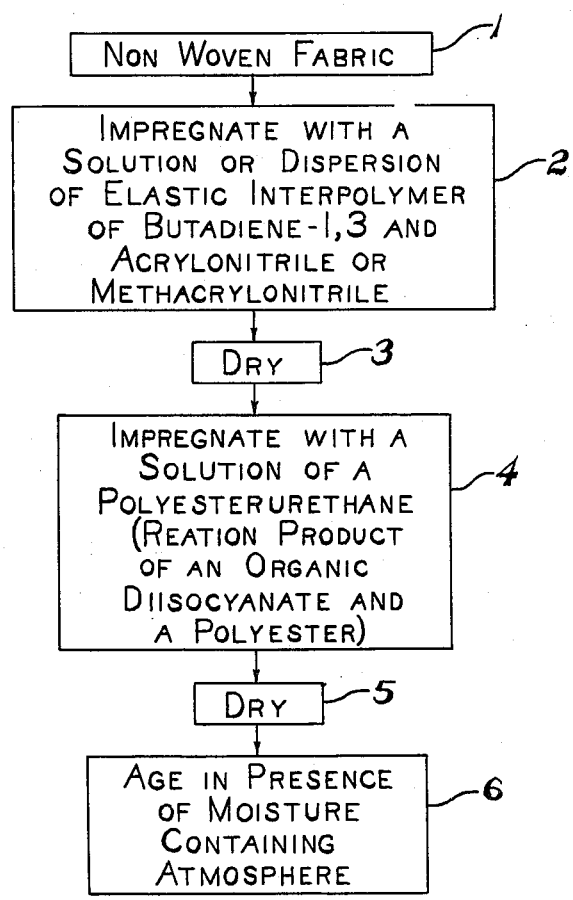
INVENTOR.
STEPHEN T. SEMEGEN
BY
ATTY.

United States Patent Office

2,973,284
Patented Feb. 28, 1961

2,973,284
LEATHER-LIKE MATERIAL

Stephen T. Semegen, Cuyahoga Falls, Ohio, assignor to The B. F. Goodrich Company, New York, N.Y., a corporation of New York Filed Apr. 30, 1957, Ser. No. 655,957

7 Claims. (Cl. 117—76)

This invention relates to a leather-like composition comprising a non-woven fibrous material, an elastic interpolymer of butadiene and acrylonitrile, and a polyesterurethane and to methods for preparing and fabricating the same.

Artificial or simulated synthetic leather substitutes are well known. Much effort has been expended in an effort to adapt synthetic polymers as substitutes for leather uses with only partial success. Some of the synthetic compositions which have been used more recently to replace leather have been vinyl polymers, mixtures of rubbers and vinyl polymers and woven fabrics treated with similar synthetic polymers. Although outstanding in some aspects, they are ordinarily seriously deficient in one or more desirable properties. From an application viewpoint one of the most notable failures of the substitute materials to date has been lack of leather-like appearance. More important, most of the plastic materials which have been used as leather substitutes, such as vinyl polymers, have extremely low moisture permeability and poor stitch tear resistance.

It is accordingly among the objects of this invention to provide leather-like compositions which have the appearance of leather, and moisture permeability and stitch tear resistance as good as that of leather. Other objects will be apparent from the description of the invention which follows.

These and other objects are accomplished through use of a composition comprising a hereinafter-defined non-woven fibrous material, an elastic interpolymer of butadiene and acrylonitrile and a polyesterurethane, which composition has a leather-like appearance, satisfactory moisture permeability, stitch tear resistance as good as that of leather, and outstanding abrasion resistance better than leather.

Coated fabrics as a class do not possess the ability to "breathe" or transpire water vapor and air. For suitable use in shoes, boots, gloves and the like which enclose or cover a part of the human body, this property is a prime prerequisite, If moisture from the body cannot escape through the article, hands and feet for instance in the case of gloves and shoes will feel and actually be damp. Such articles are uncomfortable, and in the case of feet may cause dermatological troubles. By means of this invention a satisfactory leather-like material is provided which has moisture permeability as good or better than that of leather and such materials find ready and acceptable use in gloves and shoes.

In the practice of the invention a non-woven fabric, for example a nylon mat, is impregnated first with a dispersion or solution of an elastic interpolymer of butadiene and acrylonitrile and then with a solution of hereinafter defined polyesterurethane such as the reaction product of hydroxyl poly(ethylene adipate) and paraphenylene diisocyanate. All of these features, the non-woven fabric impregnated first with the elastic interpolymer and then the polyesterurethane in hereinafter defined critical amounts and ratios of materials are necessary to obtain the desired moisture-permeable product. The impregnated non-woven fabric, which may be pressed, is dried and allowed to age in the presence of a moisture-containing atmosphere and then pressed to form a leather-like material which may be embossed and otherwise treated and fabricated in the same manner as leather into useful articles. A process for making the product of the present invention is illustrated in the accompanying flow sheet type drawing wherein non-woven fabric (1) is impregnated (2) with a solution or dispersion of an interpolymer of butadiene-1,3 and acrylonitrile or methacrylonitrile, dried (3), then impregnated (4) with a solution of a polyesterurethane, dried (5) and finally aged (6) in a moisture containing atmosphere.

A non-woven fibrous material or fabric is essential to attain the advantages of this invention. The non-woven fibrous material is necessary to obtain a composition which has a leather-like appearance and the required moisture-permeability. Woven fabrics which have been combined with some polyurethanes do not have a leather-like appearance nor the moisture permeability of the degree required for successful use in many leather applications.

Non-woven fabrics are well known and are variously defined as felts, mats and the like. The non-woven fabrics contain randomly distributed short staple fibers. The non-woven fibrous material used in the practice of this invention may be based on any fiber which is ordinarily used in the art. Cotton, rayon, wool, the polyamides such as nylon, polyacrylonitrile, vinylidene halide polymers such as vinylidene chloride, and copolymers such as vinyl chloride and acrylonitrile, polyvinyl alcohol fibers and any of other naturally occurring or synthetic fibrous materails known to those skilled in the art may be used. The fibers may be coated prior to the matting operation or the mats may be treated with the usual coating materials such as starch, polyvinyl alcohol, sizings, polyesters and other polymers.

The non-woven fabrics may be used in uncompressed and uncalendered thicknesses of about $\frac{1}{64}$ to 1 inch or thicker, or they may be calendered. Preferably, single ply uncalendered materials from about $\frac{1}{16}$ to $\frac{1}{2}$ inch apparent thickness are employed; multiple plies built up to these thicknesses are also useful. The density of the mat materials may be varied quite widely, and in terms of ounces per linear yards may vary, depending upon the nature of the fibers, from about 0.05 ounce to about 9 or 10 ounces. In the case of cotton, rayon and nylon fabric, weights from about 2 to about 5 ounces are preferably employed in thicknesses from about $\frac{1}{16}$ to about $\frac{1}{4}$ inch.

As stated, the non-woven fabric is first impregnated with a solution or dispersion of a rubbery butadiene-acrylonitrile interpolymer, or a mixture of a rubbery or soft butadiene-acrylonitrile interpolymer and polyvinyl chloride or vinyl chloride interpolymers and then impregnating the treated non-woven fabric with the polyesterurethane solution. Uniform dispersion of polymer through the fabric is essential regardless of the method used to impregnate. Amounts of the rubber interpolymer employed on the fabric may be varied from about 1 to about 150 percent pick-up. Quite surprisingly, when the non-woven fabric is so treated with a butadiene-acrylonitrile interpolymer, only small amounts of polyesterurethane are required to give a leather-like composition with the outstanding properties of the compositions of this invention. For example, when 100 percent of rubbery interpolymer pick-up is employed, only 10 percent polyesterurethane is required to give improvement in scuff resistance, stitch tear resistance and the like. Preferably amounts of the rubbery butadiene-acrylonitrile interpolymer employed are from about 5 to 150% with about 10 to 200 percent of polyesterurethane while keeping the total polymer pick-up from about 50 to about 250%, less than about 300%.

The rubber interpolymer is applied to the non-woven fabric as, preferably, an aqueous dispersion such as latex, or as a solution of interpolymer in an organic solvent. When a latex is employed, the impregnated fabric is dried before being further impregnated with the polyester-urethane solution.

The rubbery interpolymers of butadiene and acrylonitrile used are any of the well known rubbery interpolymers of this type which are prepared from monomeric mixtures containing at least about 50 percent butadiene-1,3, greater than about 25 percent acrylonitrile and 25 or less percent of other monoolefinic monomers, particularly those which contain the $CH_2=C<$ group, copolymerizable with the butadiene-1,3 and acrylonitrile such as the styrenes, acrylic and methacrylic acids and their derivatives as the esters and amides, vinyl ketones, vinyl ethers, vinylidene halides and the like. Preferred are those rubbery interpolymers prepared from monomer mixtures consisting essentially of from 55 to 75 weight percent butadiene-1,3 and from 45 to 25 weight percent acrylonitrile. Methacrylonitrile may be substituted in whole or in part for acrylonitrile. Illustrative of other useful rubbery interpolymers are those prepared from monomer mixtures containing 55 percent butadiene-1,3, 25 percent acrylonitrile and 20 percent styrene; 60 percent butadiene-1,3, 25 percent acrylonitrile and 15 percent methyl methacrylate, particularly 55 percent butadiene-1,3, 45 percent acrylonitrile and 5 percent methacrylic acid and the like. Mixtures of the interpolymer of butadiene and acrylonitrile with polyvinyl chloride and vinyl chloride interpolymers employed are of the type described in U.S. Patents 2,330,353 and 2,614,094. Useful interpolymers also may be described as those containing from about 30 to 40% bound acrylonitrile.

The polyesterurethane employed in the practice of the invention is in the form of a solution and may be prepared, for example, by the following two methods. One method involves a bulk reaction of reactants such as an organic diisocyanate and a hydroxyl terminated polyester having a molecular weight of about 4000 to 9000, and then dissolving the reaction product in a dry solvent. Another method involves reaction of the diisocyanate and polyester in the desired solvent which may be at or near the concentration desired for final application.

The polyesters employed in making the polyesterurethanes of this invention are ordinarily prepared by a condensation reaction of essentially an excess of a glycol with a dibasic acid. It is important that the polyesters be essentialy free of moisture prior to their use and that the solvents employed to make solutions therefrom are also essentially free of moisture. The molecular weights of the polyesters may vary from about 4000 to 9000. Preferably the polyester is a hydroxyl terminated polyester with molecular weight of about 4000 to 6000. Polyesters of lower molecular weight result in products in which the abrasion resistance is lower and blocking characteristics are bad.

The glycols utilized in the preparation of the polyester, such as by reaction with a polycarboxylic acid, may be ethylene glycol, propylene glycol, diethylene glycol, tetramethylene glycol, pentamethylene glycol, octamethylene glycol and the like. In general the glycol employed is a polyalkylene ether glycol or an aliphatic glycol containing from 1 to 10 carbon atoms of the formula HO—R—OH wherein R is an alkylene radical containing 2 to 10 carbon atoms and is preferably a glycol of the general formula $HO(CH_2)_xOH$ wherein $x$ is 2 to 5 and the preferred glycol is ethylene glycol. Mixtures of glycols may be employed. Only small amounts of such other hydroxyl-containing materials as the triols represented by glycerol should be present because solutions of such materials tend to gel on storage.

The polycarboxylic acids employed in preparing the polyesters are preferably aliphatic dicarboxylic acids such as adipic, succinic, maleic, fumaric, methyl succinic, di-, tri- and tetramethyl succinic, pimelic, glutaric, suberic, azelaic, sebacic and the like. Mixtures of these acids or their anhydrides also may be employed, and mixtures of the aliphatic dicarboxylic acids may be employed with lesser amounts of aromatic dicarboxylic acids, if the concentration of such aromatic acids is kept low. Most useful aliphatic dibasic acids are those containing 4 to 10 carbon atoms. Preferred are those of the formula

HOOC—R—COOH wherein R is an alkylene radical containing 2 to 8 carbon atoms. More preferred acids are those represented by the formula $HOOC(CH_2)_xCOOH$ where $x$ is a number from 2 to 4. Adipic acid is most preferred.

Although polyesters are preferred for making the polyesterurethanes of this invention, bifunctional amine-containing reactants may be employed in admixture with the dicarboxylic acid and glycol to make polyesteramides for reaction with the organic diisocyanate. The amount of bifunctional amine-containing material employed is in an amount less than 25 percent of the bifunctional amine compound, based on the amount of glycol used, and preferably the amount used is less than 15 percent so that the polyesteramide has less than 25 percent amide linkages, more preferably less than 10 percent amide linkages and more than 75 percent, more preferably more than 90 percent, ester linkages in the polymer chains, and correspondingly a similar ratio of such terminal groups. The polyesteramide reaction products, which are still essentially polyesters, when reacted with the organic diisocyanate in solution, are not as stable, that is, do not have as long a shelf life, as the polyester-base materials. Useful bifunctional amine materials which may be employed include aliphatic amino alcohols and diamines such as ethanolamine, aminobutanol, ethylene diamine, tetramethylene diamine and the like containing less than 10 carbon atoms.

The organic polyisocyanates employed are organic diisocyanates and are preferably aromatic diisocyanates. Useful organic diisocyanates include hexamethylene diisocyanate and the like, 1,5-naphthylene diisocyanate, diphenyl methane-p,p'-diisocyanate, triphenyl methane-p,p'-diisocyanate, the tolylene diisocyanates, the phenylene diisocyanates, dianisidene disocyanate, benzidene diisocyanate, durene diisocyanate, chlorophenylene diisocyanate, diisocyanate dimer and the like. Mixtures of diisocyanate, of course, may be employed and any of the aromatic diisocyanates may be used.

The ratio of aromatic diisocyanate to polyester for the reaction forming the preferred polyesterurethane may be varied from about 1.2 to 2.0 mol equivalents of aromatic diisocyanate to 1.0 mol equivalent of hydroxyl polyester and more preferably from about 1.4 to 1.8 mols to 1.0 mol of polyester. Optimum ratios with varying molecular weight polyester are about 1.4 at a polyester molecular weight of about 5000 and 1.2 at a polyester molecular weight of about 9000.

The solvents employed in preparing these solutions, or for the reaction of the polyesterurethane, preferably aromatic solvents, include benzene, toluene and chlorobenzene; isopropyl acetate, methyl ethyl ketone, acetone, methyl isobutyl ketone, nitromethane, cyclohexanone, dimethyl formamide and the like.

The solution of polyesterurethane is applied to the nonwoven material by dipping, spreading, spraying and the like. About a 25 percent total solids solution is optimum for dipping and spraying processes, although solutions containing 50 percent total solids solution also may be employed for dipping, while spreading applications ordinarily employ solutions with higher concentrations of polyesterurethane such as 50 to 75 percent total solids. An important expedient in decreasing solution viscosities is the use of cyclohexanone in the solution which decreases the amount of apparent gel.

The percent pick-up in the non-woven fabric of uniformly dispersed elastic interpolymer and polyesterurethane from dispersion or solution may be controlled and varied by varying the concentration of the solution or dispersion, the time the fabric is allowed to remain in the solution, the type of fabric and the degree of squeezing or pressing employed after the initial dip. The degree of pick-up where porosity (water permeability) is desired is varied from about 50 to less than about 300 total percent polymer based on the original non-woven fabric. Most preferably the total percent pick-up is about 100 to about 200 percent based on the fabric. It is at this concentration that the most desirable balance of leather-like physical appearance and all physical properties are obtained. For example, the moisture permeability of calf leather is about 780 grams per day per square meter at room temperature in a 50 percent relative humidity atmosphere. The moisture permeability of a nylon fabric with 130 percent pick-up (5% butadiene-acrylonitrile rubber and 125% polyesterurethane) is about 780 grams per day per square meter at room temperature in a 50 percent relative humidity atmosphere, and non-woven nylon fabric with about a 200 percent total polymer pick-up is very similar to leather in porosity. Moisture permeability for cotton at 150 to 200 percent total polymer pick-up almost as good as that of leather, and is highly superior to other plastic substitutes. For example, polyvinyl chloride in similar applications has only about 1 percent of the moisture permeability of leather.

Particularly outstanding is the stitch tear resistance of the impregnated fabrics of this invention which is equivalent to or better than that of leather. Even better stitch tear resistance is obtained when a pick-up of polyesterurethane of about 200 to less than 300 percent is employed.

Ordinarily after the non-woven material has been treated with a polyesterurethane solution, it is passed through squeeze rolls as desired, and dried. The coated material is then aged for several days, preferably in a moisture-containing atmosphere of a relative humidity greater than 25 percent, as high as 100%, and, more preferably, about 50 percent or higher. This step is readily accomplished by rolling the treated fabric loosely between polyethylene sheets and placing in the recited water atmosphere. During this aging period a cure or cross-linking and hardening of the polymer occurs. This usually takes several days 24–72 hours at 25° C. and may be expedited by increasing the moisture content of the atmosphere and higher aging temperatures. If a proper tertiary amine accelerator is added to the impregnating solution, this aging may be greatly accelerated so that the desired cure will take place in a few hours.

The solutions of polyesterurethane for use in preparing the leather-like compositions of this invention are preferably prepared by one of the procedures set forth below in Examples 1 and 2.

*Example 1*

150 grams (0.104 mol) of hydroxyl poly(ethylene adipate) of about 3900 molecular weight is dried by stirring at 100° C. for 15 minutes at 5 to 6 mm. pressure. The dry hydroxyl poly(ethylene adipate) is mixed with 28.6 grams (0.178 mol) of finely-granular para-phenylene diisocyanate and the mixture stirred in a closed system at 95 to 100° C. for 30 minutes. The syrupy amber product is dissolved in 178.6 grams of dry toluene by warming and stirring at 60° C. The resultant transparent, fluid, amber solution is stored under anhydrous conditions. This method is particularly applicable where low boiling solvents are employed.

*Example 2*

A mixture of 1346 ml. of dry toluene and 660 grams (0.443 mol) of hydroxyl poly(ethylene adipate) is heated to 107° C. in a stirred autoclave equipped with a condenser positioned for downward distillation. The mixture is stirred until 400 ml. of distillate are collected. At this point distillation is stopped and the condenser replaced with a reflux condenser equipped with a calcium chloride tube and 120 grams (0.753 mol) of para-phenylene diisocyanate are added to the polyester solution as fine granules and an exothermic reaction ensues while the mixture is stirred at room temperature. The fluid, transparent, amber, homogeneous 50 percent solution is then stored under anhydrous conditions.

Preparation of typical leather-like compositions of the invention are described below.

*Example 3*

A sheet of non-woven nylon fabric weighing about 3 to 4 ounces per square yard, containing about 5 to 10% of an interpolymer of 67% butadiene and 33% acrylonitrile and treated with 5 percent polyvinyl alcohol binder, is immersed in a 50 percent solution of polyesterurethane prepared as described in Example 1. The sheet is then drawn through squeeze rolls to remove excess solution, allowed to dry and air-cured at room temperature for about 48 hours at a relative humidity of about 50%. About 8 ounces of polyesterurethane are deposited per square yard of fabric. Fabric containing less polyesterurethane is prepared by employing a 25 percent solution and in this case there are deposited about 4 ounces of polyesterurethane per square yard of fabric or about 100 to 125 percent pick-up on the fabric. The air-dried, aged fabrics are then lightly pressed to a smooth or embossed surface over a rubber mat. The resulting pressed materials have the appearance and feel of leather, tensile strength, elongation and stitch tear resistance equal to or superior to the best grade animal leather, and a moisture permeability and abrasion resistance better than that of leather.

|  | Calf Leather | Nylon, 100% pick-up | 200% pick-up |
| --- | --- | --- | --- |
| Tensile strength, p.s.i | 3,300 | 2,600 | 4,800 |
| Elongation, percent | 30 | 35 | 40 |
| Graves Tear, lbs./in | 600 | 650 | 540 |
| Water/day/sq.-meter, grams | 780 | 1,150 | 1,120 |
| Flex resistance | Excellent | Excellent | Excellent |
| Taber Abrasion, Index | 100 | 443 |  |

In porosity, ease of fabrication and appearance the product closely resembles leather. In addition, bleach resistance, scuff resistance, aging resistance, ozone and sunlight resistance, flex resistance, oil and chemical resistance are superior to natural leather. These materials are useful in the preparation of shoe soling, shoe uppers, luggage, football covers, belting, luggage and many other places where leather is now utilized.

As suggested, the polyesterurethane solution also may be applied to the non-woven fabric by spreading or spraying as successfully as the dipping operation so long as uniform dispersion through the fabric is obtained. For spreading applications 50 to 75 percent total solids solutions are ordinarily employed. For spraying applications 10 to 25 percent solutions are usually preferred, and the solution is preferably diluted with cyclohexanone.

*Example 4*

A 25 percent solids polyesterurethane solution prepared as described in Example 1 or 2 and diluted is employed to impregnate the following non-woven nylon and cotton mats containing about 5 to 10% of an interpolymer of butadiene and about 35% bound acrylonitrile:

| Material | Nylon | Cotton |
| --- | --- | --- |
| Weight per sq. yd ounces | 3 | 7 |
| Original gauge inches | 0.025 | 0.05 |
| Finished weight per sq. yd ounces | 18.0 | 19.0 |
| Finished gauge inches | 0.060 | 0.090 |
| Ratio of polyesterurethane to fabric | 5:1 | 1.7:1 |
| Weight of polyesterurethane per sq. yd ounces | 15 | 12 |
| Tensile strength, p.s.i. | 3,300 | 2,600 |
| Elongation, percent | 50 | 40 |
| Graves Tear, lbs./in | 740 | 500 |
| Water/day/sq. meter, grams | 206 | 167 |

Sheets of the fabric are dipped in a tank containing the polyesterurethane solution and when thoroughly saturated, are lifted, the excess solution allowed to drain off, wrapped in polyethylene film and air-cured for two days at room temperature. The sheets are then pressed out between smooth or embossed plates in a hot curing press to a thickness of about 0.1 inch. Very smooth surfaces on the sheets are obtained by pressing between a smooth plate and a rubber pad for about 1 to 2 minutes at 340° F. followed by cooling in the press. Embossed surfaces are obtained by substituting embossing plates for the smooth plate and using a rubber pad backing. These sheets have a leather-like appearance and are successfully employed in making luggage and brief cases which are scuff resistant, have excellent stitch tear resistance and the appearance of leather. It should be noted that excessive pressing of impregnated sheets having a high concentration of polyesterurethane reduces the moisture permeability somewhat. The pressed compositions may be treated by any of the usual processes employed to treat and finish leather.

*Example 5*

Superior compositions are prepared from polyesters having molecular weights from about 4000 to 6000. A solution of polyesterurethane prepared from 1.4 mols of para-phenylene diisocyanate or 2,4-tolylene diisocyanate and 1 mol of hydroxyl poly(ethylene adipate) of 5000 molecular weight is employed to impregnate a non-woven nylon fabric containing about 5% of a rubbery interpolymer of butadiene and acrylonitrile and the fabric dried and aged. The resulting leather-like material has a tensile strength of 5100 pounds per square inch and a Graves Tear value of 1260 pounds per inch. The pressed composition may be treated by any of the processes employed to treat and finish leather and is formed into superior leather-like products.

*Example 6*

The 48 hour aging period for the dipped sheets may be decreased through the use of a tertiary amine accelerator. Preferred is triethyl amine and other trialkyl amines, pyridine and the like. The amount employed may be varied depending upon the time available for storing the dipped sheet. For example, 0.01 percent triethylene amine, based on the amount of polyesterurethane of Example 3, results in sheets properly aged in 24 hours at room temperature and 40% humidity. 0.1 percent results in properly aged sheets in 6 hours having a tensile strength of 3100 pounds per square inch and a Graves Tear value of 640 pounds per inch, and 1 percent results in sheets which will age in one hour.

Colored masterbatches of the polyesterurethane solution are readily made which result in colored sheets of leather-like product.

*Example 7*

A pigment masterbatch suitable for pebble grinding is made as follows:

| Material | Weight, Parts |
| --- | --- |
| 75% total solids polyesterurethane solution (Example 1) | 133.3 |
| Dry benzene | 66.7 |
| Yellow iron oxide | 83.0 |
| Red iron oxide | 16.5 |
| Channel black | 0.5 |

This mixture is pebble milled and diluted to the desired pigment and polyesterurethane content for dipping as follows:

| | |
| --- | --- |
| Polyesterurethane (dry weight) | 100.0 |
| Yellow iron oxide | 15.0 |
| Red iron oxide | 3.0 |
| Channel black | 0.1 |
| Dry benzene | 300.0 |

20 by 20 inch sheets of ¼ inch non-woven fabric mats of both nylon and cotton containing about 5% of a rubbery interpolymer of butadiene and acrylonitrile are dipped into this solution. When thoroughly saturated, the sheets are lifted, the excess solution allowed to drain off, are wrapped in polyethylene film to evaporate the solvent and air-cured. After 48 hours the sheets are aged sufficiently to press cut between smooth or embossed plates and in hot curing press. The resulting sheets after pressing for about 1 to 2 minutes at 340° F., followed by cooling in the press have a leather-like appearance and color, and may be embossed, if desired, have wiping characteristics of leather whereby shape is retained after compression during such operations as shoe building, have strength, moisture permeability, stitch tear resistance and other properties equivalent to or better than leather.

| | Nylon | Cotton |
| --- | --- | --- |
| Tensile strength, p.s.i. | 2,600 | 3,400 |
| Elongation, percent | 100 | 30 |
| Graves Tear, lbs./in. | 740 | 520 |
| Water/day/sq. meter, grams | 703 | 554 |

Similar compositions using other pigments such as titanium dioxide, ink black, chromium oxide, lead, chromate, ultra-marine blue and the like may be employed to make white, gray, black, green, yellow and blue products.

When woven fabrics are employed in similar processes, materials which do not have the appearance of leather and which have very poor moisture vapor permeability are obtained.

*Example 8*

Non-woven cotton fabric (6 oz./yd.) is impregnated with a butadiene-acrylonitrile latex prepared by polymerizing a monomer mixture of 67 percent butadiene-1,3 and 33 percent acrylonitrile. After drying, the percent pick-up of copolymer on the fabric is 98. The treated dry fabric is then impregnated with a 25 percent solution of the polyesterurethane described in Examples 1 and 2 in benzene. Percent pick-up of this polymer is about 9 (based on fabric-rubber weight) or 18 (based only on the original fabric weight). After air curing and pressing, the following physical properties are obtained:

| | |
| --- | --- |
| Tensile strength, p.s.i. | 4625 |
| Elongation, percent | 25 |
| Graves tear, lbs./in. | 520 |

The moisture permeability of this product exceeds that of natural leather. When other polyesters of varying molecular weights and such as polyethylene glutarate, polytrimethylene adipate and polypentamethylene adipate; other aromatic diisocyanates such as 1,5-naphthylene diisocyanate, meta-phenylene diisocyanate, tolylene diisocyanate and the like; and other non-woven fabrics of the types disclosed hereinabove are employed, similar valuable leather-like compositions are obtained.

This application is a continuation-in-part of my copending application Serial Number 478,537, filed December 29, 1954, now abandoned.

Although representative embodiments of this invention have been specifically described, it is not intended or desired that the invention be limited solely thereto as it will be apparent to those skilled in the art that modifications and variations may be made without departing from the spirit and scope of the invention as defined in the appended claims.

I claim:

1. A method for preparing a moisture permeable leather-like material which comprises first impregnating a non-woven fabric with about 5 to about 150 weight percent of a rubbery interpolymer of a major proportion of butadiene-1,3 and a minor proportion of acrylonitrile in liquid media, drying said fabric, secondly impregnating said fabric with about 10 to about 200 weight percent of a polyesterurethane in solution form and prepared by reacting about 1.2 to 2.0 mol equivalents of an aromatic diisocyanate with one mol equivalent of an essentially hydroxyl terminated polyester of a glycol of the formula HO—R—OH wherein R is an alkylene radical containing 2 to 10 carbon atoms and an aliphatic dicarboxylic acid, again drying said fabric, said polyester having a molecular weight from about 4000 to about 9000, and the total polymer content of said rubbery interpolymer and said polyesterurethane on said fabric being from about 50 to less than about 300% per 100 parts by weight of said fabric, and then curing said impregnated fabric by exposure to a moisture-containing atmosphere for a sufficient time to cause cross-linking of said polyesterurethane.

2. A permeable leather-like material comprising a non-woven fabric of textile fibers with the fibers impregnated with successive layers of (a) a rubbery interpolymer of a major proportion of butadiene-1,3 and a minor proportion of a nitrile selected from the group consisting of acrylonitrile and methacrylonitrile, said interpolymer being present in a quantity of about 5 to about 150% by weight of interpolymer based on the original fibers, and (b) a polyesterurethane derived from the reaction in the presence of moisture of about 1.2 to 2.0 mol equivalents of an organic diisocyanate with one mol equivalent of a polyester of an aliphatic dicarboxylic acid and a glycol of the formula HO—R—OH wherein R is an alkylene radical containing 2 to 10 carbon atoms, said polyester being essentially hydroxyl terminated and having a molecular weight from about 4000 to about 9000, said polyesterurethane being present in a quantity of about 10 to 200% by weight of polyesterurethane based on the original fibers, and the total quantity of both layers (a) and (b) being from about 50 to about 300% by weight based on the original fibers.

3. A leather-like material as in claim 2 in which the rubbery interpolymer contains at least about 50% butadiene-1,3 and greater than 25% acrylonitrile.

4. A leather-like material as in claim 2 in which the polyesterurethane is derived from an aromatic diisocyanate.

5. A leather-like material as in claim 2 in which the non-woven fabric consists of nylon fibers.

6. A permeable leather-like material comprising a non-woven fabric of nylon fibers with the fibers impregnated with successive layers of (a) a rubbery interpolymer of 50 to 75% butadiene-1,3 and 25 to 50% acrylonitrile, said interpolymer being present in a quantity of about 10 to 150% by weight of interpolymer based on the original fibers, and (b) a polyesterurethane derived from the reaction in the presence of moisture of about 1.4 to 1.8 mol equivalents of an aromatic diisocyanate with one mole equivalent of a polyester of an aliphatic dicarboxylic acid of the formula $HOOC(CH_2)_xCOOH$ wherein $x$ is a number from 2 to 4 and a glycol of the formula $HO(CH_2)_xOH$ wherein $x$ is a number from 2 to 5, said polyester being hydroxyl terminated and having a molecular weight from about 4000 to about 6000, and the total quantity of both layers (a) and (b) being from about 100 to less than 300% by weight based on the original fibers.

7. A leather-like material as in claim 6 in which the layer (a) is present in a quantity of from about 10 to about 50% and the layer (b) is present in a quantity of from about 50 to about 150%.

References Cited in the file of this patent

UNITED STATES PATENTS

| 1,905,749 | Richter et al. | Apr. 25, 1933 |
| 2,159,639 | Schur | May 23, 1939 |
| 2,333,917 | Christ et al. | Nov. 9, 1943 |
| 2,650,212 | Windemuth | Aug. 25, 1953 |
| 2,657,151 | Gensel et al. | Oct. 27, 1953 |
| 2,697,048 | Secrist | Dec. 14, 1954 |
| 2,715,588 | Graham et al. | Aug. 16, 1955 |
| 2,721,811 | Dacey et al. | Oct. 25, 1955 |
| 2,723,935 | Rodman | Nov. 15, 1955 |
| 2,790,736 | McLaughlin | Apr. 30, 1957 |

FOREIGN PATENTS

| 149,423 | Australia | Dec. 15, 1952 |